United States Patent [19]

Milbredt et al.

[11] Patent Number: 5,083,341

[45] Date of Patent: Jan. 28, 1992

[54] TWIN CASTER, PARTICULARLY A STEERING CASTER

[75] Inventors: Manfred Milbredt, Remscheid; Wolfgang Block, Schwelm, both of Fed. Rep. of Germany

[73] Assignee: Tente-Rollen GmbH & Co., Fed. Rep. of Germany

[21] Appl. No.: 562,490

[22] Filed: Aug. 3, 1990

[30] Foreign Application Priority Data

Sep. 11, 1989 [DE] Fed. Rep. of Germany ....... 8910890

[51] Int. Cl.[5] ............................................. B60B 33/00
[52] U.S. Cl. ........................................ 16/35 R; 16/47; 188/1.12
[58] Field of Search ............................ 16/35 R, 45, 47; 188/1.12, 74, 76, 84

[56] References Cited

U.S. PATENT DOCUMENTS

| 1,671,774 | 5/1928 | McIntosh | 16/38 |
|---|---|---|---|
| 3,237,940 | 3/1966 | Johnson | 16/35 R |
| 4,637,093 | 1/1987 | Kassai | 16/35 R |
| 4,677,706 | 7/1987 | Screen | 16/35 R |
| 4,747,180 | 5/1988 | Screen | 16/35 R |
| 4,821,369 | 4/1989 | Daniels | 16/35 R |
| 4,911,269 | 3/1990 | Perl | 16/35 R |
| 4,941,552 | 7/1990 | Screen | 16/35 R |

FOREIGN PATENT DOCUMENTS

| 2702211 | 9/1977 | Fed. Rep. of Germany ..... 16/35 R |
| 3119649 | 3/1987 | Fed. Rep. of Germany . |

*Primary Examiner*—Robert L. Spruill
*Assistant Examiner*—Thomas C. Schoeffler
*Attorney, Agent, or Firm*—Martin A. Farber

[57] ABSTRACT

A twin caster, in particular a steering caster, having a carrier (3), wheels, and a vertical mounting pin (22), the wheels being held via an axle (6) on the carrier (3) and the carrier (3) supporting the mounting pin (22), a brake element (32) being furthermore arranged on the carrier (3). For simplified construction, easier assembly, and a development which takes up high brake forces without damage, the carrier (3) is developed in disk shape and have an opening (39) for lateral insertion in the form of a plug/back-grip connection for the brake element which is developed as brake ram (32).

16 Claims, 10 Drawing Sheets

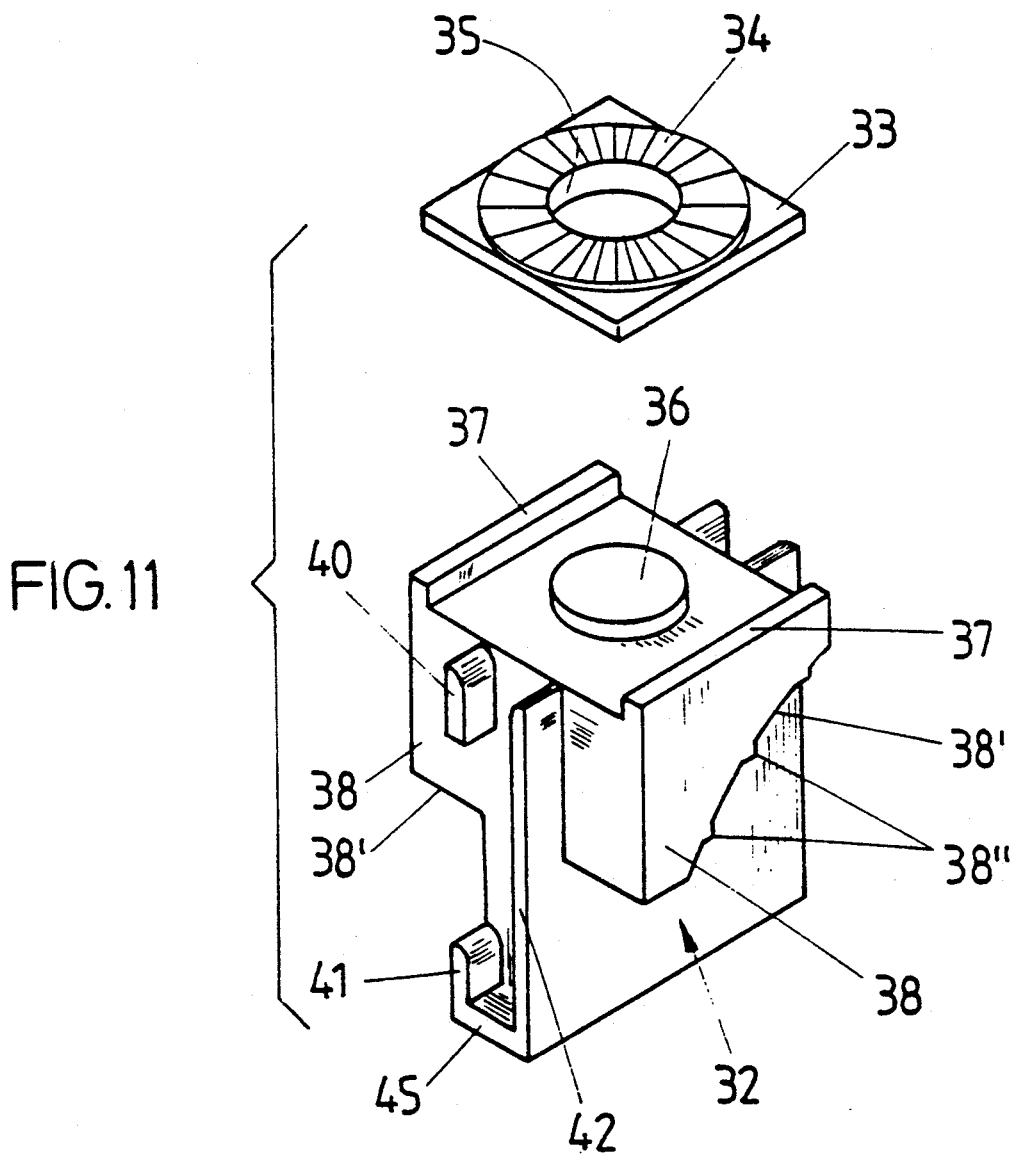

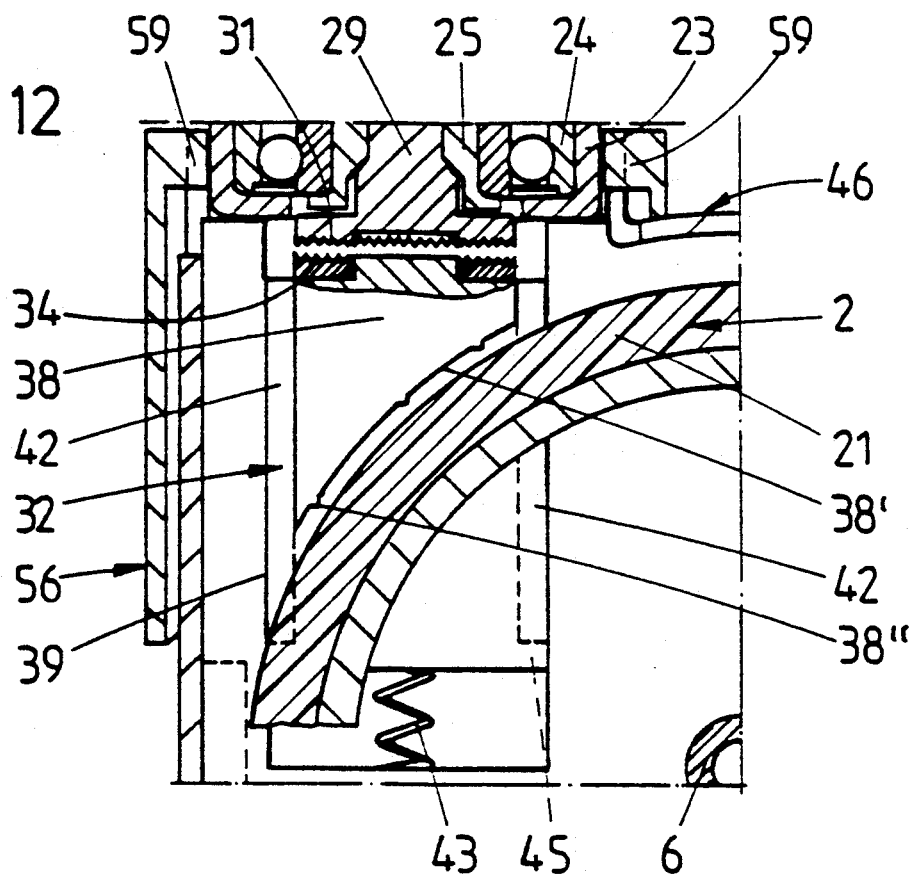
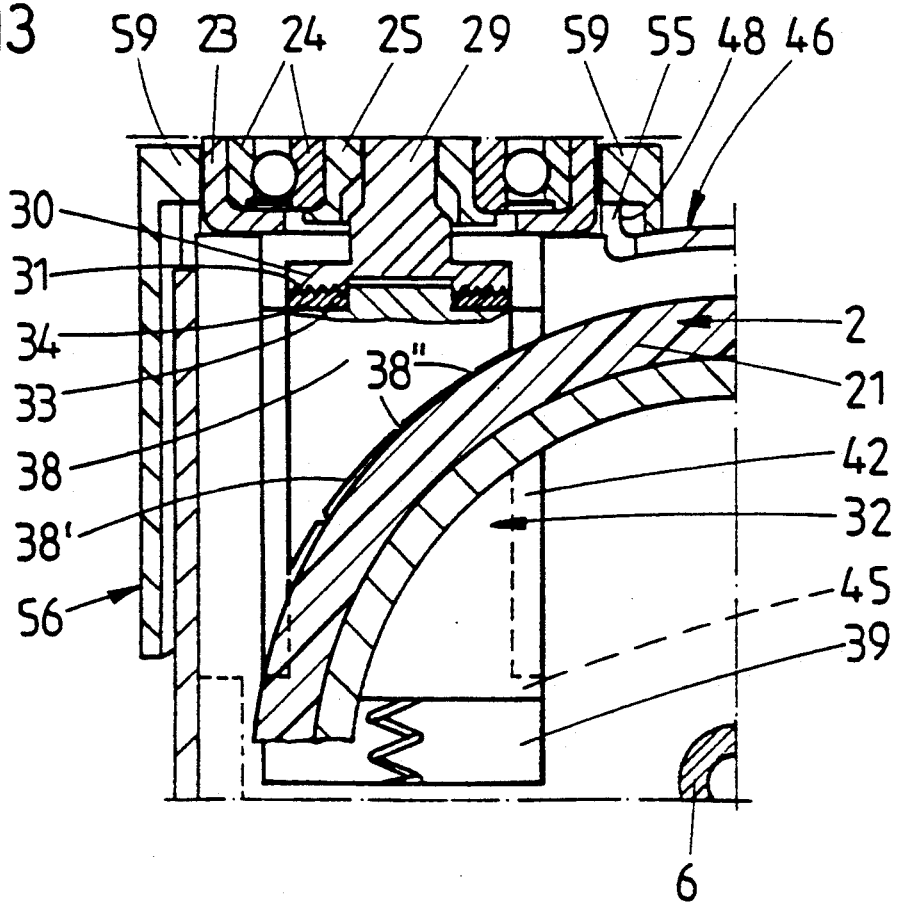

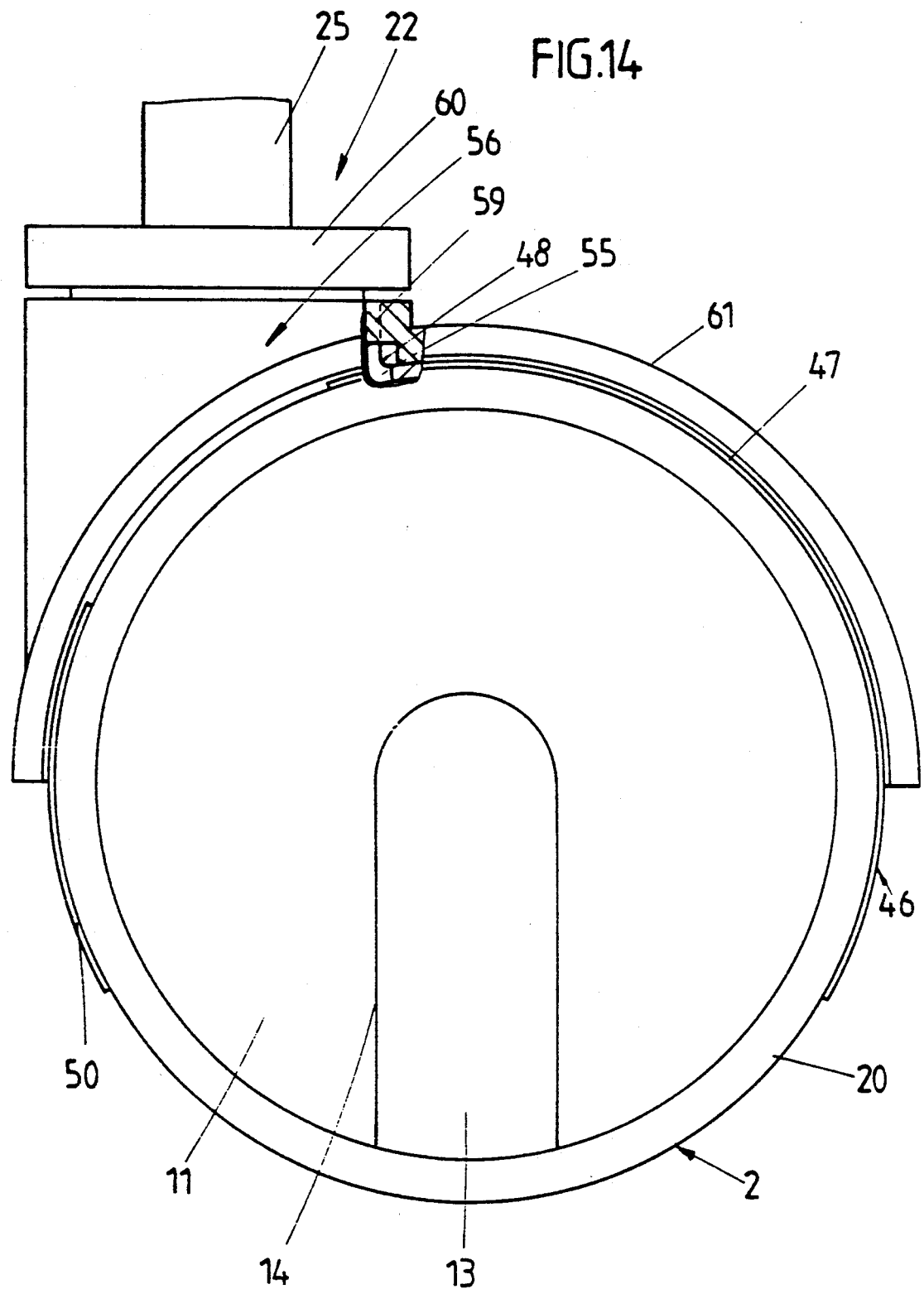

TWIN CASTER, PARTICULARLY A STEERING CASTER

FIELD AND BACKGROUND OF THE INVENTION

The present invention relates to a twin caster, particularly a steering caster.

Such a twin caster is known from U.S. Pat. No. 4,677,706, in which case the carrier which extends between the wheels is developed as an injection molding. To the bottom of it there is firmly bolted a brake element developed in the form of a leaf spring, the free end of which cooperates with a toothing of a brake tappet which is longitudinally displaceable in the mounting pin. Upon an upward displacement of the brake tappet, the brake element comes into toothed engagement with the toothing of the brake tappet. Furthermore, the brake element is brought into braking engagement with the wheels. This development is of complicated construction. Furthermore, it is poorly adapted to take up large forces without damage.

SUMMARY OF THE INVENTION

The object of the present invention is so to develop a twin caster of the type in question, in a manner simple to manufacture, that in addition to the simplified construction and ease of assembly, large braking forces can be taken up without damage.

As a result of the development of the invention there is created a twin caster of this type, particularly a steering caster, which is of simple construction and of increased value in use. As carrier there is now used a structural part which is exclusively disk-shaped and inexpensive to manufacture. The brake element, which is developed as brake ram, can be attached to it without the use of tools by means of an insertion/back-grip connection. This is brought about in the manner that, first of all, the brake ram is inserted from the side into the opening in the disk-shaped carrier. This is followed by displacement in transverse direction, thereby obtaining the back-grip so that the brake ram is then fastened in unlosable manner to the carrier.

The brake ram is itself of stable development and is capable of transmitting high braking forces without damage. For the application of the brake ram to the wheels, brake jaws which protrude laterally on the brake ram are used. They can be integral with the brake ram. As soon as the brake ram is released, the compression spring which rests against the bottom limiting wall of the opening returns it into the release position. Accordingly there are precisely defined end positions. In order to obtain the installation of the brake ram by way of the plug/back-grip connection, lateral guide projections are developed on the opening, these projections being in form-locked coincidence with holding projections in the installed condition.

The brake ram is of such a nature that, with the same manner of operation as in the case of Federal Republic of Germany 31 19 649 C2, brake blocking and swing (pivot) blocking of the caster can be effected. This takes place by means of the actuating ram which is guided in the mounting pin. For this purpose the upper end surface of the brake ram and the lower end surface of the tappet are toothed for the blocking against swinging. The control of the actuating tappet can be such that a blocking of swinging is first of all obtained. Then only the toothings engage in each other. The brake ram, however, is still not forced into braking application with respect to the wheels. Upon further displacement of the actuating tappet, the brake blocking of the wheel is then additionally brought about. However, it is also possible to bring about both the brake blocking and the swing blocking exclusively after a displacement of the actuating tappet. Advantages in use result from the fact that the wheels develop stepped-down brake-surface rings on their inner sides facing each other. These rings then cooperate with the brake jaws.

The carrier performs a further function in the manner that a cover can be attached on it. Holding projections which protrude from the bottom of the cover come along a circumferential line on both sides against the carrier, which is of substantially circular development, and thereby secure the cover in transverse direction. The attachment is so stable that no contact can take place between the wheels and the cover. Furthermore, the cover protects the steering caster from dirt. This cover is continued by a sleeve which surrounds the mounting pin and is so constructed that it can receive a mounting-pin sheathing. This is effected also by means of a plug connection, for which purpose the sleeve forms corresponding insertion grooves. This measure makes it possible to attach differently shaped mounting-pin sheathings to the twin caster in a simple fashion. For example, the mounting-pin sheathing can continue in the form of a protective plate which extends over the wheels. Furthermore, sheathings which serve as adapter for corresponding carriages can be attached in simple fashion. Easy plugging together is assured if the insertion grooves extend vertically.

The carrier is then itself used for the holding of the axle. As axle there is used a sleeve the sections of which protruding above the disk-shaped carrier support the wheels via anti-friction bearings. A mounting opening in the outer wheel wall serves for the installing of the sleeve. The radially directed closure cover serves to protect the bearing from dirt. This cover is doubly secured. For this purpose it has a central clip collar and a clip collar shifted radially therefrom, the collars entering into a corresponding clip connection with respect to the wheel wall. The double securing of the closure cover creates a stable attachment to the wheel wall.

It has been found favorable from the standpoint of appearance and use for the closure cover to pass as flat surface into the outer wheel wall. The latter forms a rim bed to receive the travel-surface ring. The brake-surface ring is developed integral with it, forming a step. Wear of the travel-surface ring, therefore, does not affect the braking action. Since flexible material such as rubber or a suitable plastic is preferably selected for the travel-surface ring, the brake-surface ring is also imparted favorable prerequisites for cooperation with the brake ram and its brake jaws. A high stability in position of the travel-surface ring with brake surface ring formed thereon is obtained in the manner that the bottom surface of the rim bed widens conically towards the outside.

BRIEF DESCRIPTION OF THE DRAWINGS

Two embodiments of the invention will be explained below with reference to the drawings, in which:

FIG. 11 is a view in perspective of the brake ram with toothed disk;

FIG. 12 is a partial longitudinal section through the steering caster at the height of the brake-surface ring with brake jaws in released position;

FIG. 13 is a view corresponding to FIG. 12 but with brake ram acting on the brake-ring surface; and FIG. 14 is a view of the twin caster in accordance with the second embodiment, the mounting-pin sheathing continuing into a protective plate which extends over the wheels.

DETAILED DESCRIPTION OF THE PREFERRED EMBODIMENTS

Figure 1:
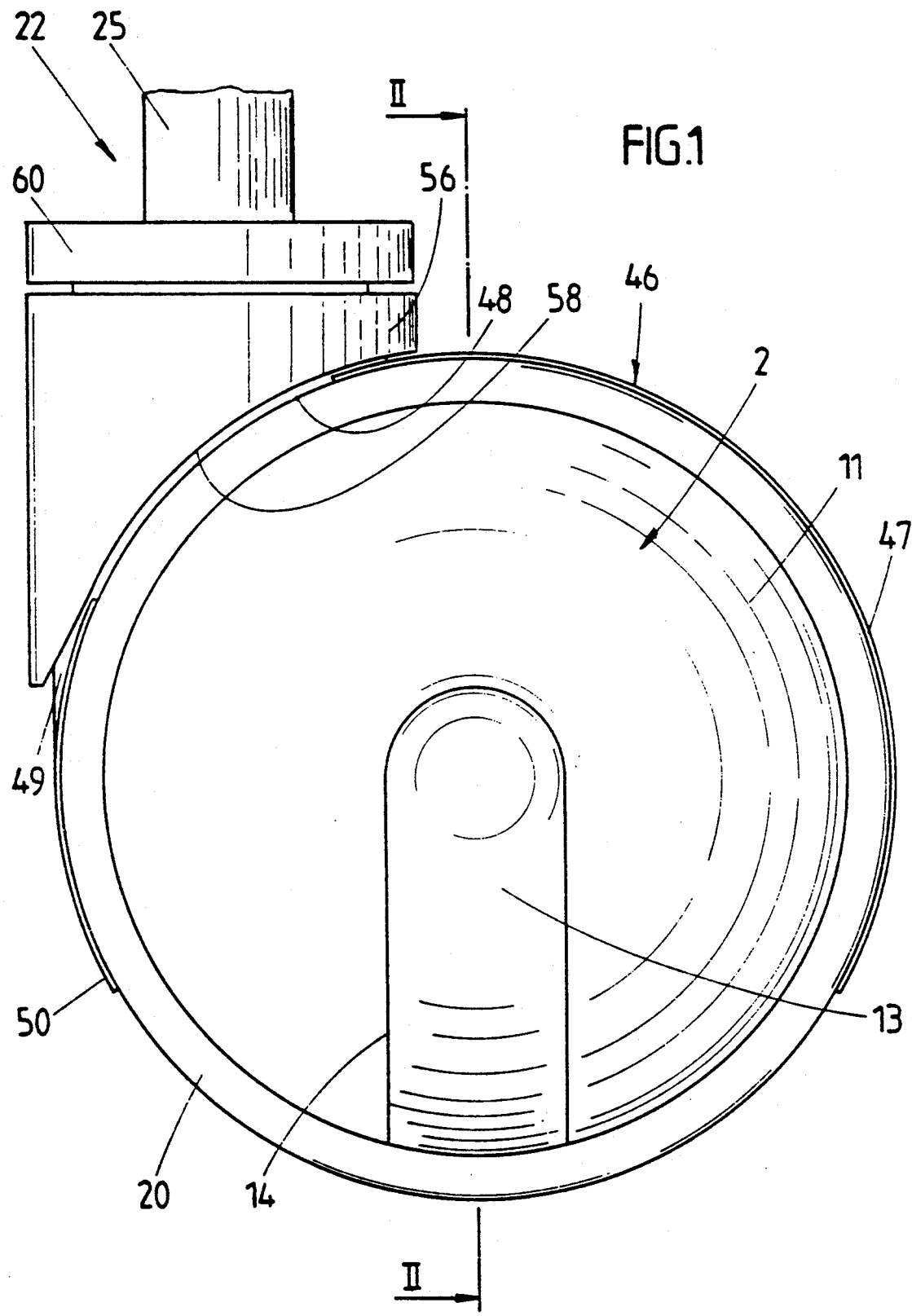
FIG. 1 is a view of a twin caster in accordance with the first embodiment.
Figure 2:
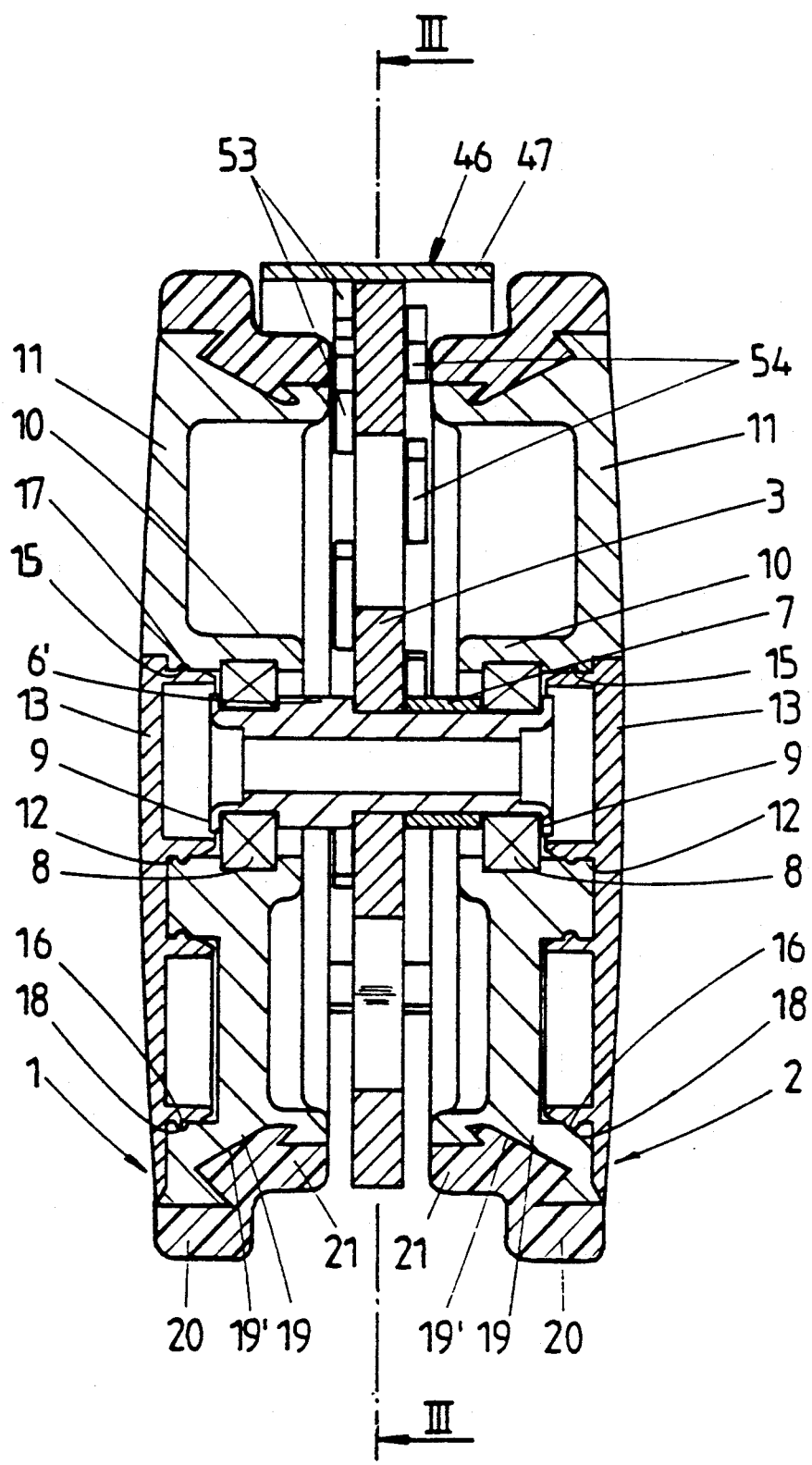
FIG. 2 is a cross section along the line II—II of FIG. 1.

The twin caster in accordance with the first embodiment, shown in FIGS. 1-13, has a disk-shaped carrier 3 extending between two wheels 1, 2. The carrier is substantially of circular shape. The largest diameter of the disk-shaped carrier 3 is less than the outside diameter of the wheels 1, 2. The lower region of the carrier 3 is step-shaped and extends also along a circular arcuate line of smaller diameter. The corresponding steps are designated 4 and 5.

In central arrangement, the carrier 3 receives an axle which in the embodiment is developed as sleeve 6. The latter is seated in non-turnable manner in the carrier 3 and rests via its collar 6' of larger cross section against the one side surface of the carrier 3. Instead of a collar, a bushing 7 is placed on the sleeve 6 on the opposite side of the carrier 3. Each end of the sleeve bears an anti-friction bearing aid which rests against the collar 6' and against the sleeve 7 and is fixed in axial direction by an end flanging 9 of the sleeve 6.

The anti-friction bearings 8 are received by a central, inwardly directed hub 10 of an outer, slightly barreled wheel wall 11. In order to be able to produce the flanging 9 on the ends of the sleeve, a mounting opening 12 is provided in each wheel wall 11, the opening being covered by a radially directed closure cover 13. For the latter, the wheel wall 11 forms a radial recess 14 of such a nature that the closure cover 13 passes in the same plane into the outer wheel wall 11. A central clip collar 15 and a clip collar 16 which is displaced radially thereto cooperate with the mating clip grooves 17, 18 of the wheel wall 11 to hold the closure cover 13.

Each wheel wall 11 forms a rim bed 19 to receive a travel-surface ring 20 which consists of flexible material such as rubber, etc. Integral with it, there extends a brake surface ring 21 of smaller diameter, with the formation of a step. The travel surface and brake surface extend approximately parallel to the axle of the wheel. Furthermore, the travel-surface ring 20 and the brake-surface ring 21 are of approximately the same length. The bottom surface 19' of the rim bed 19 is conical, becoming wider towards the outside. The rim bed 19 is provided with undercuts into which form-fitting projections of the travel-surface ring 20 engage and thus hold it in unlosable fashion on the rim bed 19.

In the upper region of the circular carrier 3, an angle member 3' is formed by vertical and horizontal tangents to it. The horizontal leg of said angle member serves for fastening a mounting pin 22. The latter has a bearing shell 23 which is fastened by welding to the upper leg of the angle member and receives an anti-friction bearing 24. The latter surrounds the lower end of an insertion sleeve 25. For axial non-displaceability, the insertion sleeve 25 forms a collar 26 above the anti-friction bearing 24. The lower end 27 of the insertion sleeve is flanged and engages below the anti-friction bearing 24 on its lower side. Between the collar 26 and the upper side of the anti-friction bearing, a cover ring 28 then also extends. By this development the carrier 3, together with its wheels 1, 2 mounted on it, can swing around a vertical axis. The insertion sleeve 25, on its part, is installed in a receiving part (not shown) in a chassis.

An actuating tappet 29 is guided centrally in the insertion sleeve 25 in longitudinally displaceable but non-turnable manner. The non-turnability is obtained by flats on both sides.

The lower end of the actuating tappet 29 which is acted on in upward direction by a spring (not shown) is formed into a radially protruding tappet plate 30. The lower end surface of the latter is provided with a toothing 31. A lever-actuatable cam (not shown) can serve for controlling the tappet 29.

The upper end surface of a brake ram 32 lies opposite the aforementioned toothing 31. The upper end surface is formed by a square disk 33 having a circular gear rim 34 protruding in the direction of the tappet 29. An end pin section 36 of the brake ram 32 protrudes into a central bore 35 in the disk 33. The disk 33 is secured against turning by two diametrically opposite webs 37 which, with the brake ram 32 installed, extend parallel to the plane of the disk-shaped carrier 3. The said two webs 37 are located on brake jaws 38 which protrude from the wide sides of the brake ram and engage over the facing brake-surface rings 21.

The brake ram 32 is seated displaceably in an opening 39 in the carrier 3. Said opening extends below the tappet 29 and protrudes from the upper leg of the angle member 3'. The brake ram 32 is inserted from the one side of the disk-shaped carrier 3 and then comes, by transversely directed displacement, into a back-gripping position, producing a plug/back-grip connection. In order to obtain this connection, lateral projections 39' 39" extend into the opening 39, said projections being in form-locked coincidence with holding projections 40, 41, 42 in the installed condition. In detail, this means that during the insertion the holding projections 40, 41 extend into the niches formed by the guide projections 39', 39". The insertion movement is limited by the holding projection 42, which is continuous over the entire length of the brake ram 32. The transverse displacement of the brake element or brake ram 32 in upward direction must then take place, the holding projections 40, 41 entering into the back-grip with the lateral guide projections 39' of the opening 39. This back-grip position is maintained by a compression spring 43 which engages into a blind hole 44 in the bottom of the brake ram 32 and rests against a lower limiting wall 39''' of the opening 39. The stop limitation of the brake ram 32 is obtained by the lower connecting web 45 between the holding projections 41, 42 which are opposite each other, the web 45 resting against the facing guide projections 39'. The stop-limited position of the brake ram 32 is the position of release in which the concavely extending brake surfaces 38' lie at a slight distance from the brake-surface rings 21; see FIGS. 4 and 12. In order to increase the braking effect, the brake jaws 38 form transversely extending brake ribs 38''.

The carrier 3 has a cover 46 which can be placed on it. By means of a section 47 which extends in the shape of a circular arc, said cover engages between the travel-surface rings 20 and grips in this connection over the brake-surface rings 21. The section 47 extends over an angle of about 120° and has an inner radius which is adapted to the outer radius of the carrier 3 in the corresponding region. The upper end of the section 47 extends out of a sleeve 48 which surrounds the mounting pin 22. In detail, the sleeve 48 surrounds the bearing shell 23 in form-locked manner and thus fixes and centers the cover 46 in the region there. This sleeve 48 is continued on the side opposite the section 47 by a vertically directed section 49 which passes into a short arcuate end section 50. Both the section 49 and the end section 50 lie against the outer contour of the carrier. Furthermore, both the end section 50 and the free end of the section 47 form inwardly directed detent shoulders 51, 52 which engage behind the steps 4, 5 of the carrier 3 in the final phase of the attachment movement of the cover 46. The distance between the detent projections 51, 52 is less than the maximum diameter of the carrier 3. This means that, during the attachment movement, the sections 47, 49 move out resiliently, for which purpose suitable material is selected for the cover.

Holding projections 53, 54 are formed on the bottom of the section 47. They extend along a circumferential line on both sides towards the side surfaces of the carrier 3 in such a manner that the one holding projections 53 are located on the one side of the carrier 3 and the other holding projections 54 on the other side. In this way, the section 47 of the cover 46 is secured against transverse displacement with respect to the carrier 3.

The aforementioned sleeve 48 which surrounds the mounting pin forms diametrically opposite insertion grooves 55 for the holding of a mounting-pin sheathing 56. The latter is developed in sleeve shape with a diameter which is greater than that of the sleeve 48. Spacer webs 57 of the sheathing which point inwards in radial direction come against the circumferential surface of the sleeve 48 and thus center the mounting-pin sheathing. The lower-end edge of the sleeve-shaped mounting-pin sheathing extends concentrically to the travel-surface rings 20. The mounting-pin sheathing is secured against turning in the manner that inwardly directed radial webs 59 extend inwards from it, which webs extend in form-fitting manner into the vertically extending insertion grooves 55; see, in particular, FIG. 5. The plug connection is effected preferably by frictional lock so that the cover is held securely. Securing could possibly also be effected by a guide pin, screw, etc.

The mounting-pin sheathing is covered by a cover ring 60 placed on the insertion sleeve 25.

The following manner of operation is obtained.

Figure 3:
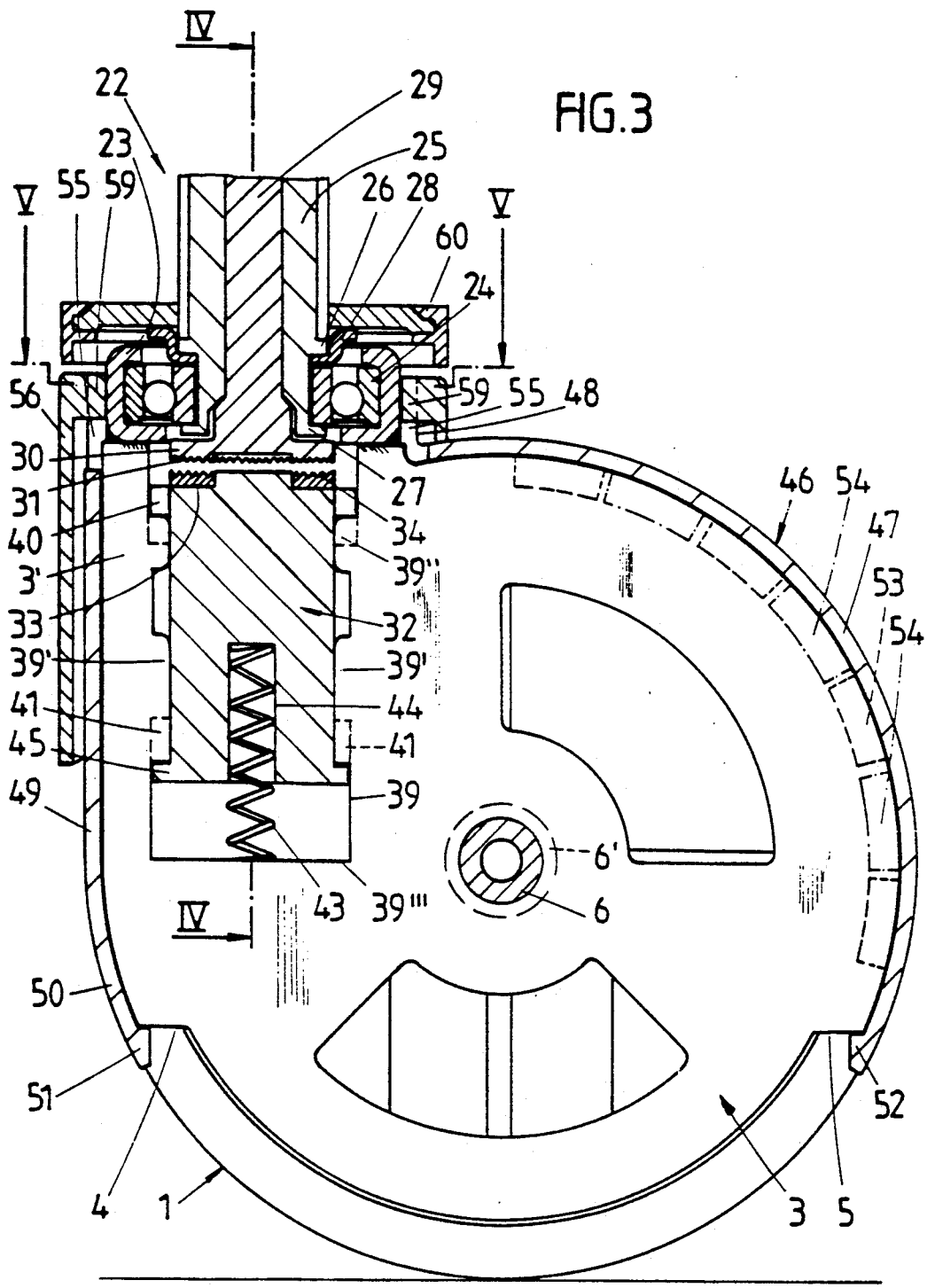
FIG. 3 is a cross section along the line III—III of FIG. 2.
Figure 4:
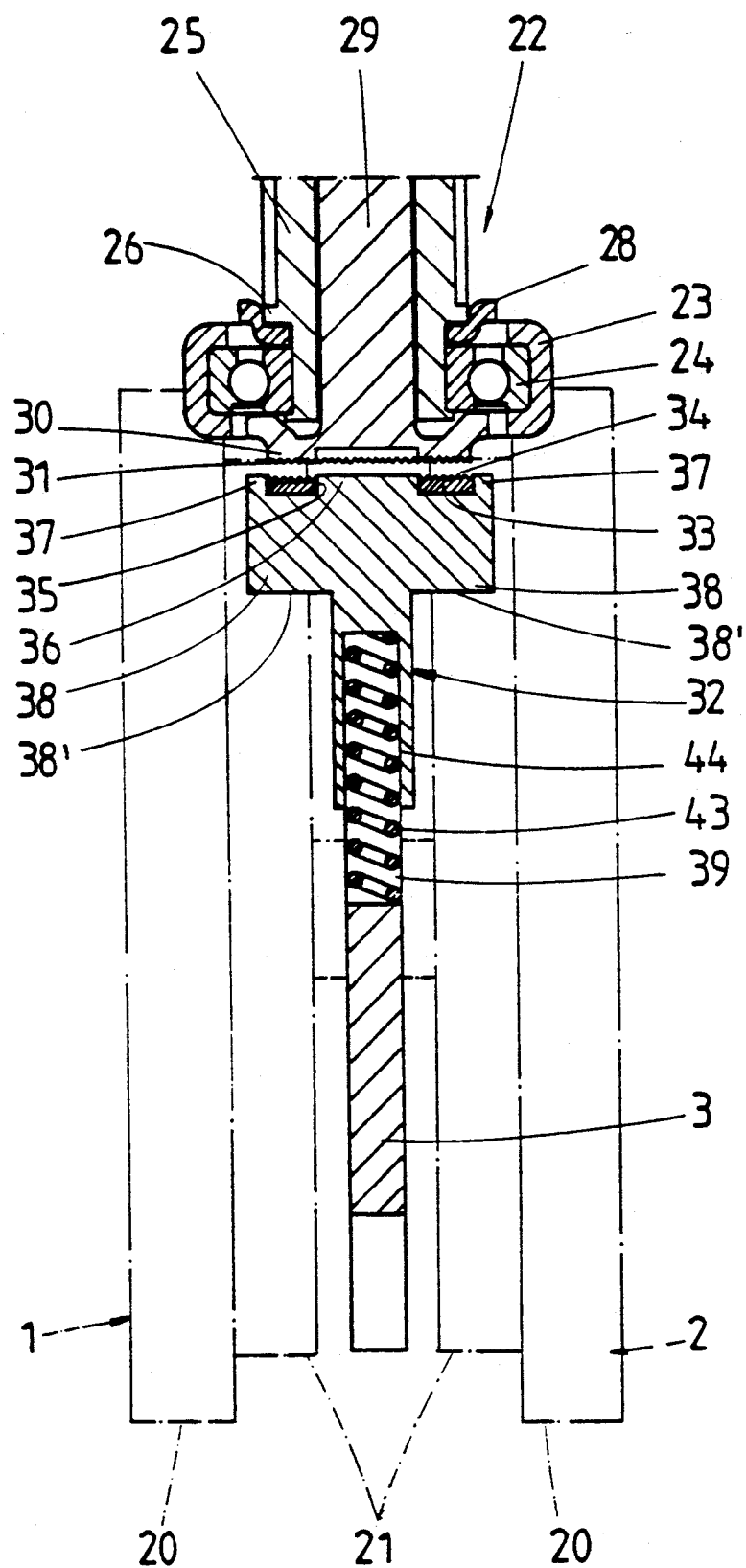
FIG. 4 is a cross section along the line IV—IV of FIG. 3.
Figure 5:
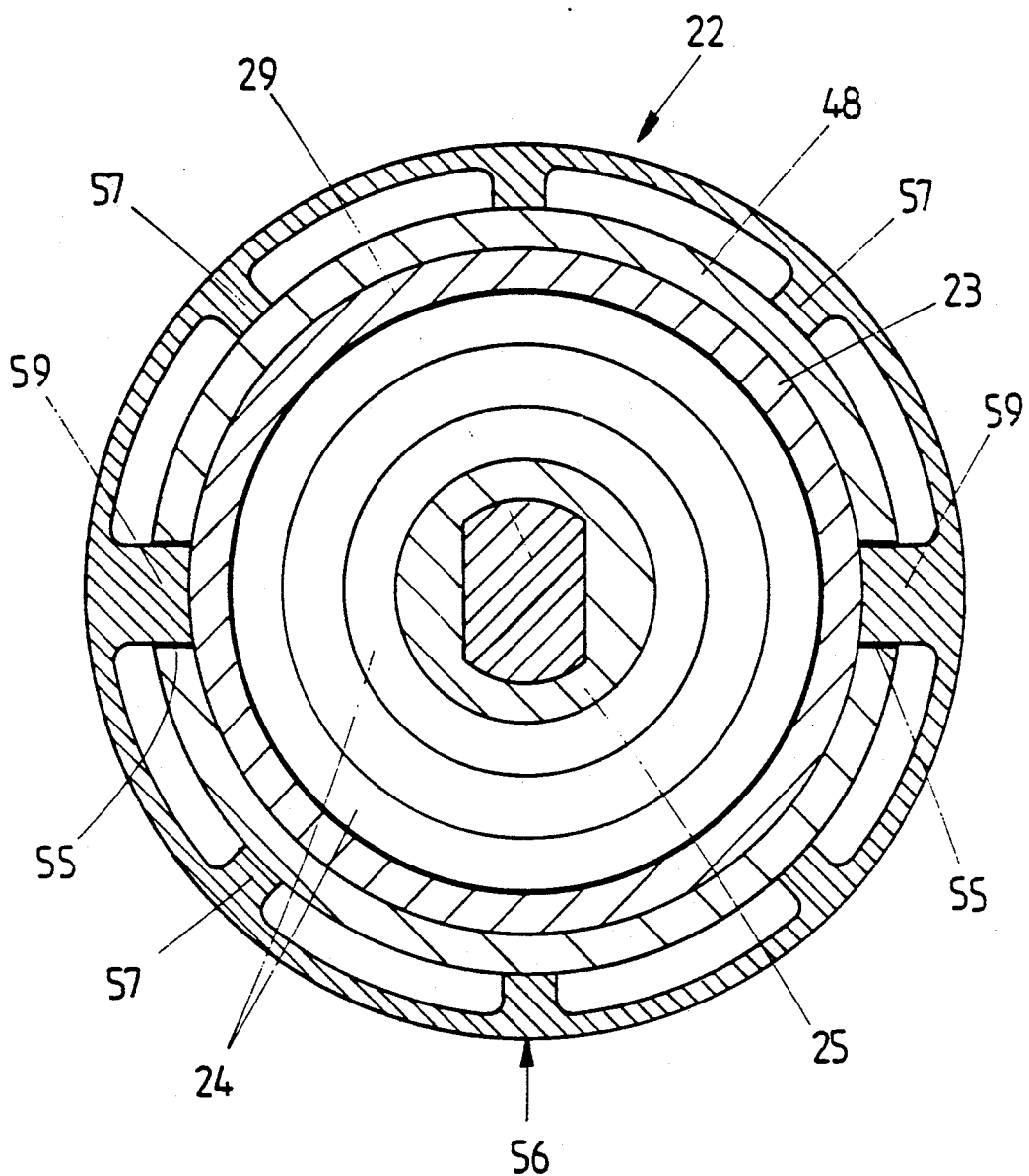
FIG. 5 is a section along the line V—V of FIG. 3.
Figure 6:
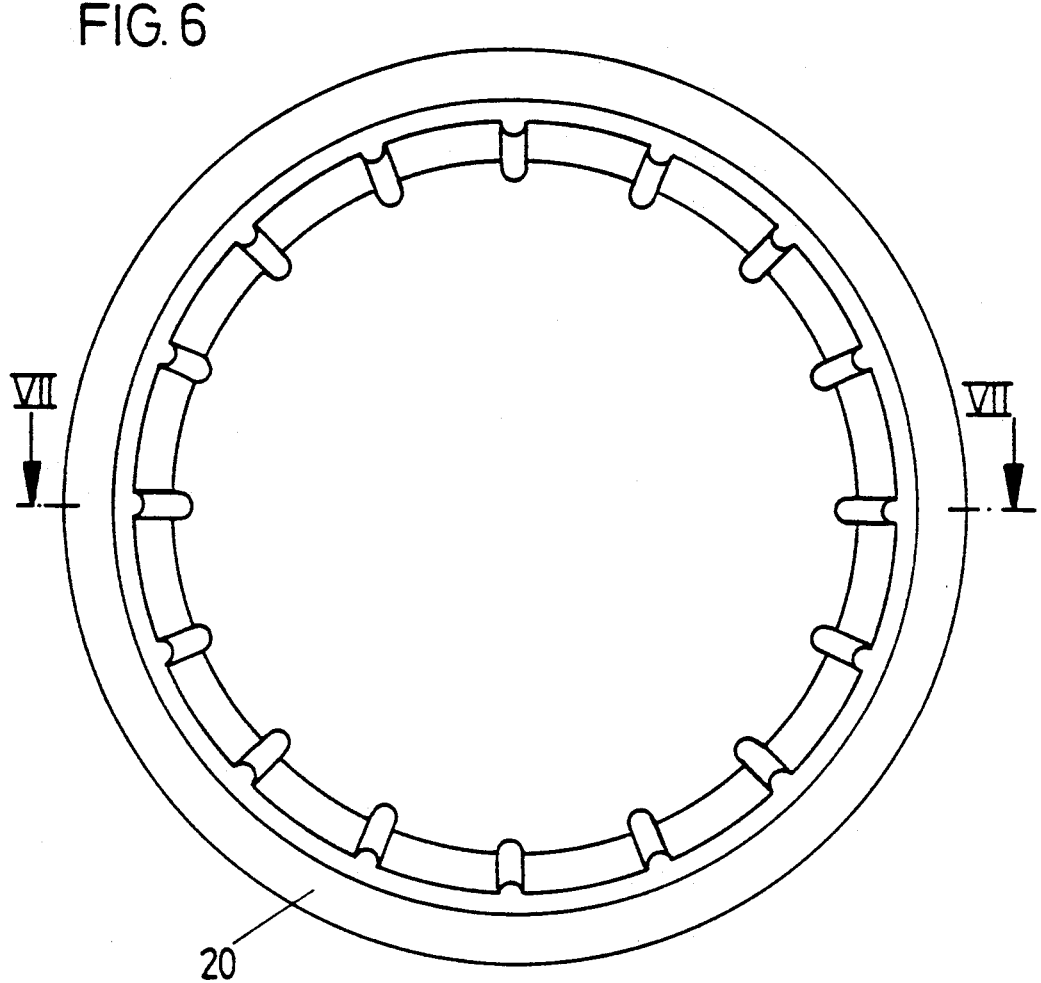
FIG. 6 shows in individual view the travel-surface ring, seen from the outside.
Figure 7:
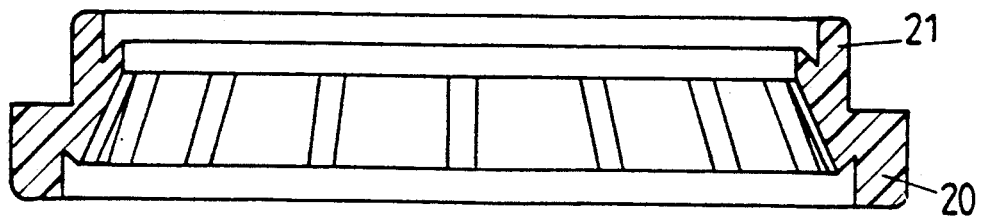
FIG. 7 is a section along the line VII—VII of FIG. 6.
Figure 10:
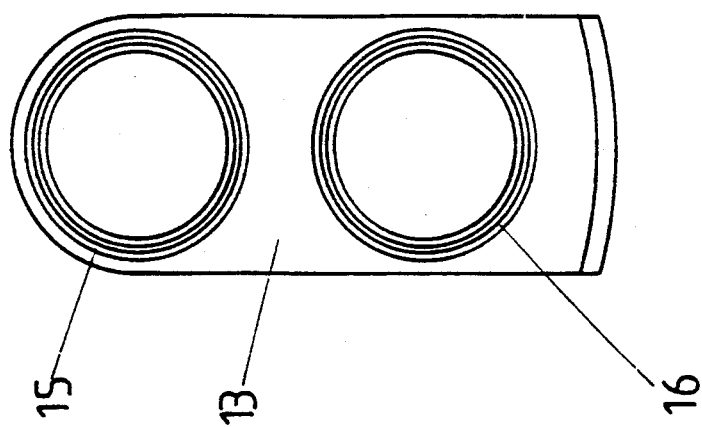
FIG. 10 is a rear view of the closure cover, showing the clip collars.
Figure 9:
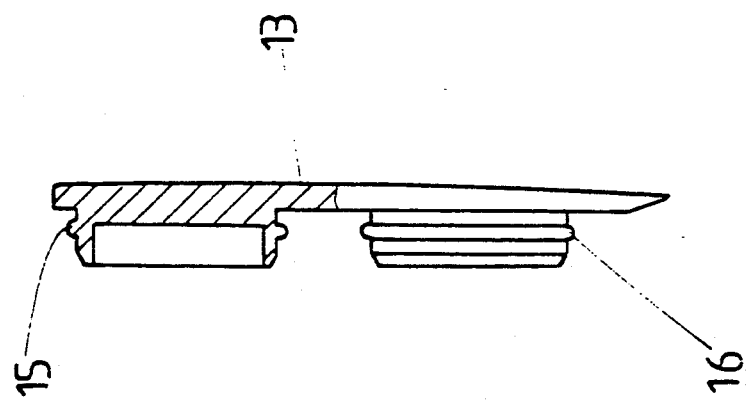
FIG. 9 is a cross section through same along the line IX—IX of FIG. 8.
Figure 8:
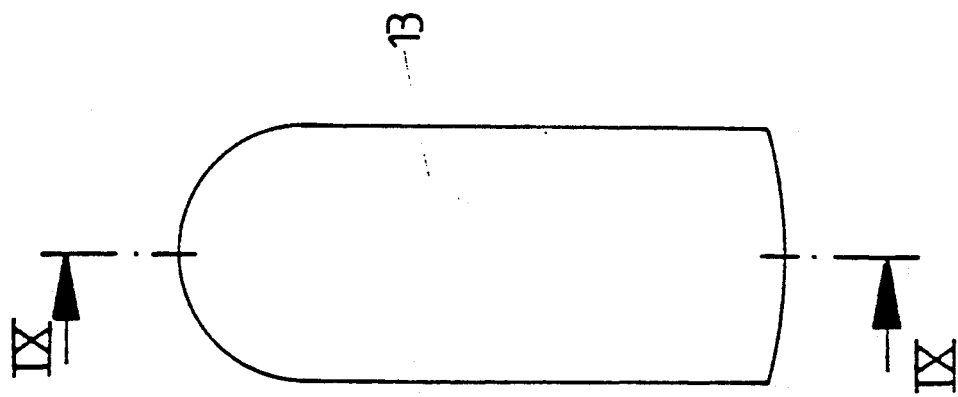
FIG. 8 shows the closure cover in an individual view.

In accordance with FIGS. 3 and 12, the brake ram 32 is in the released position. This is true also of the actuating tappet 29. If brake blocking and swing blocking is to be effected, then the tappet 29 is displaced by actuation of a manual lever, in downwards direction against the spring acting upon it. The toothing 31 of the tappet plate 30 strikes with its entire surface over a closed circular-ring surface in engagement with the toothed rim 34 of the brake ram 32. At the same time, the brake ram 32 is moved in downward direction, the brake surfaces 38' of the brake jaws 38 coming into intimate contact with the brake-surface rings 21 of the wheels 1, 2. This development permits high braking forces to be transmitted without damage.

If the release position is to be brought about, then the brake tappet 29 must be displaced in the opposite direction. Its toothing 31 moves away from the brake ram 32. As a result of its being acted on by compression spring, the ram can also travel a certain amount in upward direction into the stop position, with lifting of the brake jaws 38 from the brake-surface rings 21.

Such a control of the ram 29 is possible that after partial displacement only swing blocking of the twin caster takes place. The carrier 3, together with the wheels 1, 2, can then not be swung around the vertical axle. Only the wheels 1, 2 can turn around their axis. After a further displacement of the tappet 29, the previously described brake and swing blocking then take place.

The second embodiment, shown in FIG. 14, corresponds extensively to the first embodiment. Therefore, identical parts have been provided with the same reference numbers. Differing from the first embodiment, the mounting-pin sheathing 56 bears a protective plate 61 which extends also over the wheels 1, 2. Said protective plate and the sheathing 56 thus represent a coherent structural part which can also be attached by plug connection.

Further structural developments are possible which serve, for instance, as adapter between a carriage and the twin caster. The placing of these adapter parts on the sleeve 48 is also effected by a plug connection.

We claim:

1. A twin caster comprising:
   a carrier having a disk shape, a first wheel, a second wheel, a mounting pin, an axle, a brake, and a tappet for activating the brake;
   wherein the mounting pin is oriented vertically relative to a horizontal direction of travel of the caster;
   the wheels are secured rotatably via the axle on the carrier, the carrier extending into a space between the wheels;
   the carrier holds the mounting pin;
   the brake includes a brake ram which is slidably mounted within a vertically extending opening in the carrier, a laterally extending first jaw and a laterally extending second jaw for engagement with said first wheel and said second wheel upon activation of the brake; and
   the tappet is displaceably mounted within a sleeve of the pin for vertical movement against the brake ram.

2. A twin caster according to claim 1, wherein said laterally extending brake jaws are formed integrally with said brake ram.

3. A twin caster according to claim 1, further comprising
   a compression spring; and
   wherein said brake ram is urged into a position of release by the compression spring, the spring resting against an edge of the opening in said carrier.

4. A twin caster according to claim 1, wherein holding projections extend from said ram and lateral guide projections extend from an edge of said opening of said carrier; and the lateral guide projections are in form-locked coincidence with the holding projections upon installation of said ram in said opening.

5. A twin caster according to claim 1, wherein inner sides of said wheels face each other, there being a stepped brake-surface ring disposed at a peripheral region of the inner side of each of said wheels for cooperation with said brake jaws.

6. A twin caster according to claim 1, wherein an upper end surface of said brake ram receives said tappet for braking said wheels and for blocking a pivotting of said wheels.

7. A twin caster according to claim 6, wherein an upper end surface of said brake ram and a lower end surface of said tappet are developed with a toothed configuration for the blocking of pivotting.

8. A twin caster according to claim 7, wherein the lower end surface of said tappet comes into engagement over its entire surface along a closed circular ring at a toothed rim of the upper surface of said brake ram.

9. A twin caster according to claim 1, further comprising a cover secured to said carrier and having on a bottom side of the cover, holding projections disposed along a circumferential portion of said carrier on both side of said carrier, the circumferential portion of said carrier being substantially circular.

10. A twin caster according to claims 9, further comprising a sheathing for said mounting pin; and wherein said cover is provided with a sleeve which surrounds said mounting pin and has insertion grooves for holding the mounting-pin sheathing.

11. A twin caster according to claim 10, wherein said insertion grooves of said cover extend vertically.

12. A twin caster according to claim 1, further comprising anti-friction bearings; and wherein said axle is formed by a sleeve which is received centrally in said carrier and supports each of said wheels by respective ones of the anti-friction bearings.

13. A twin caster according to claim 12, wherein each of said wheels comprises an outer wheel wall having a mounting opening which provides access to one of said bearings;

the caster has a closure cover for the wheel-mounting opening, the cover having a first clip collar directed radially toward the wheel-mounting opening for securing the cover to the outer wheel wall; and the cover has a second clip collar displaced radially to the first clip collar for mounting the cover to the wheel wall.

14. A twin caster according to claim 13, wherein said closure cover in each of said wheels is disposed in a common plane with said outer wheel wall.

15. A twin caster according to claim 1, wherein each of said wheels comprises a wheel wall with a rim bed, and a travel-surface ring which is received by the rim bed of the wheel wall; and the travel-surface ring continues into a brake-surface ring with the formation of a step in the rim bed.

16. A twin caster according to claim 15, wherein in each of said wheels, there is a bottom surface of the rim bed which extends conically, becoming wider towards the outside of said wheel.

* * * * *